Patented Oct. 23, 1951

2,571,993

UNITED STATES PATENT OFFICE 2,571,993

NITRIC ACID-SODIUM HYDROXIDE
DIGESTION OF LIGNOCELLULOSE

Germaine Marie Henriette Desorbay,
Paris, France

No Drawing. Application March 16, 1948, Serial
No. 15,271. In France March 19, 1945

4 Claims. (Cl. 92—9)

This application is a continuation in part of my U. S. patent application Serial No. 661,351, filed by me on April 11, 1946, now abandoned, for Processes of Obtaining Paper Pulp.

My present invention relates to processes of manufacturing paper pulp, and more particularly to processes of manufacturing paper pulp from vegetable substances, such as wood and the like.

It is an object of my present invention to provide processes of manufacturing paper pulp having a high output and adapted for obtention of high quality pulp products.

It is a further object of my present invention to eliminate all disadvantages present in the presently known processes using high temperatures, which disadvantages consist mainly in relatively low output, and pulp of inferior quality.

In order to attain the above objects I propose, in accordance with my present invention, to provide a process of manufacturing paper pulp comprising in combination the steps of subjecting a vegetable substance first to a treatment with nitric acid without heating it during such treatment, and thereafter subjecting the thus treated vegetable substance to a treatment with an alkaline lye, without heating the treated vegetable substance during such alkaline treatment above a moderate temperature, e. g. 35° C.

In accordance with a preferred embodiment of my present invention, I subject the vegetable substance to be transformed into paper pulp first to a treatment with a nitric acid solution, preferably a nitric acid solution having a density of about 30° Baumé, while not permitting the temperature of said vegetable substance to rise above room temperature, e. g. 15° C., then separate from the thus treated vegetable substance at least substantially all the nitric acid solution used for treating it, thereafter subject the thus nitric acid treated vegetable substance to a treatment with an alkaline lye solution, preferably having a concentration of between .5 and 5% without heating the substance during such treatment above 35° C., and finally separate from the thus treated vegetable substance transformed substantially into paper pulp, at least substantially all alkaline lye solution used for treating it.

I wish to stress that both the nitric acid treatment, as well as the alkaline lye treatment, are carried out at moderate temperatures. Actually, in normal cases, no heating at all is necessary, and I prefer to omit such heating as far as possible. However, if during the alkaline lye treatment, the temperature of the surrounding air drops below 5° C., the acid treated vegetable substance is too cold to react with the alkaline lye solution, and in such exceptional cases it might be necessary to slightly heat the acid treated vegetable substance, either before or during treatment with the alkaline lye soultion. However, such heating, better defined as warming, of the acid treated vegetable substance should not, under any circumstances, exceed 35° C., and is kept preferably to 15° C., when at all necessary.

I wish to note that it is possible to use the separated nitric acid and alkaline lye solutions repeatedly for treatment of consecutive batches of vegetable substances to be transformed into paper pulp. Of course, it will be necessary to always add some additional fresh treating solutions, since traces of the same will be retained by the treated vegetable substance.

I have found that the separated alkaline lye solution always contains some traces of nitric acid removed from the vegetable substance during the alkaline treatment. Cooling of the thus separated alkaline lye solution after removal will result in separation of alkaline nitrate which can then be used again for the purposes of the present invention.

In the following, I will describe several specific examples for manufacturing paper pulp in accordance with my present invention. However, it should be stressed that my present invention is not limited in any way to these examples.

*Example I*

Conifer wood is treated at about 15° C. with a nitric acid solution having a density of about 30° Baumé. Thereafter, the nitric acid solution is removed. The thus nitric acid treated conifer wood is then subjected to an alkaline lye solution treatment without heating. Finally, the alkaline lye solution is removed, and the thus obtained paper pulp further treated in the usual manner.

*Example II*

Oak wood is treated with a nitric acid solution, while being cooled to a temperature between 20 and 5° C., preferably to about 15° C. Thereafter, the nitric acid solution is removed, and the nitric acid treated wood is subjected to a treatment with an alkaline lye solution having a concentration of about 3%. Assumed that such alkaline lye treatment is carried out in an atmosphere having a temperature of less than 5° C., the alkaline lye—oak wood mixture—is heated to between 15 and 35° C., preferably to about 15° C., so as to enable action of the alkaline lye solution. After due treatment with the alkaline lye solution, the same is separated, and the treated oak wood further processed in known manner.

*Example III*

Birch wood is treated for a period of between 3 and 48 hours depending upon the size of the wood particles with a nitric acid solution, having a density of about 30° Baumé, while being cooled to about 15° C. The thus acid treated birch wood is further treated in one of the manners described in Examples I and II.

It will be understood that each of the elements described above, or two or more together, may also find a useful application in other types of processes of manufacturing wood pulp.

While I have described the invention as embodied in processes of producing wood pulp from vegetable substances, I do not intend to be limited to the details shown, since various modifications and structural changes may be made, without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What I claim as new and desire to secure by Letters Patent is:

1. A process of manufacturing paper pulp from a vegetable substance which comprises digesting said vegetable substance with an agent consisting mainly of a concentrated nitric acid solution having a density of about 30° Bé. at about room temperature, removing substantially all of the nitric acid from the digested vegetable substance, digesting said nitric acid digested vegetable substance with a caustic alkali solution of 0.5-5% concentration at about room temperature, removing substantially all of the caustic alkali solution from the treated vegetable substance and recovering a paper pulp.

2. A process of manufacturing paper pulp from a vegetable substance which comprises digesting said vegetable substance with an agent consisting mainly of a nitric acid solution having a density of about 30° Bé. at a temperature of about 15° C., removing substantially all of the nitric acid from the digested vegetable substance, digesting said nitric acid digested vegetable substance with a caustic alkali solution of 0.5-5% concentration at about room temperature, removing substantially all of the caustic alkali solution from the treated vegetable substance and recovering a paper pulp.

3. A process of manufacturing paper pulp from a vegetable substance which comprises digesting said vegetable substance with an agent consisting mainly of a nitric acid solution having a density of about 30° Bé. at a temperature of about 15° C., removing substantially all of the nitric acid from the digested vegetable substance, digesting said nitric acid digested vegetable substance with a caustic alkali solution of 0.5-5% concentration at a temperature of about 15-35° C., removing substantially all of the caustic alkali solution from the treated vegetable substance and recovering a paper pulp.

4. A process of manufacturing paper pulp from a vegetable substance which comprises digesting said vegetable substance with an agent consisting mainly of a nitric acid solution having a density of about 30° Bé. while cooling to a temperature of about 5-20° C., removing substantially all of the nitric acid from the digested vegetable substance, digesting said nitric acid digested vegetable substance with a caustic alkali solution of 0.5-5% concentration at about room temperature, removing substantially all of the caustic alkali solution from the treated vegetable substance and recovering a paper pulp.

GERMAINE MARIE HENRIETTE DESORBAY.

REFERENCES CITED

The following references are of record in the file of this patent:

UNITED STATES PATENTS

| Number | Name | Date |
|---|---|---|
| 1,526,863 | Muller | Feb. 17, 1925 |
| 1,777,751 | Franz | Oct. 7, 1930 |
| 1,813,531 | Boistesselin | July 7, 1931 |

FOREIGN PATENTS

| Number | Country | Date |
|---|---|---|
| 490,102 | Great Britain | Aug. 9, 1938 |

OTHER REFERENCES

Paper Industry and Paper World, April 1939, pp. 41-48.

Paper Industry and Paper World, June 1939, pp. 335-343.

Paper Industry and Paper World, August 1947, p. 742.